United States Patent
Kingman et al.

(10) Patent No.: US 10,314,116 B1
(45) Date of Patent: Jun. 4, 2019

(54) GLAZED PANEL HEATING SYSTEMS

(71) Applicants: David E. Kingman, Campbell, CA (US); Ibuki Kamei, Santa Clara, CA (US); James R. Wilson, Cupertino, CA (US); John Raff, Menlo Park, CA (US); Martin Melcher, Sunnyvale, CA (US)

(72) Inventors: David E. Kingman, Campbell, CA (US); Ibuki Kamei, Santa Clara, CA (US); James R. Wilson, Cupertino, CA (US); John Raff, Menlo Park, CA (US); Martin Melcher, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 152 days.

(21) Appl. No.: 15/595,158

(22) Filed: May 15, 2017

Related U.S. Application Data (60) Provisional application No. 62/342,342, filed on May 27, 2016.

(51) Int. Cl.
    H05B 3/06 (2006.01)
    H05B 3/84 (2006.01)
    H05B 3/86 (2006.01)

(52) U.S. Cl.
    CPC .............. *H05B 3/84* (2013.01); *H05B 3/86* (2013.01)

(58) Field of Classification Search
    CPC .................................. H05B 3/84; H05B 3/86
    USPC ................................................. 219/522, 203
    See application file for complete search history.

(56) References Cited

U.S. PATENT DOCUMENTS

| | | | | |
|---|---|---|---|---|
| 1,777,343 A | * | 10/1930 | Wilson | B60S 1/026 219/203 |
| 2,507,036 A | * | 5/1950 | McCrumm | B60S 1/026 219/203 |
| 2,991,207 A | * | 7/1961 | Miller | B32B 17/10036 156/99 |
| 3,313,920 A | * | 4/1967 | Gallez | B32B 17/10036 219/203 |
| 3,414,713 A | * | 12/1968 | Reifeiss | A47F 3/0434 219/203 |
| 4,102,722 A | | 7/1978 | Shoop | |
| 4,815,198 A | * | 3/1989 | Ramus | H05B 3/84 118/505 |
| 5,069,968 A | * | 12/1991 | Nietering | B32B 17/10 359/359 |
| 5,208,095 A | * | 5/1993 | Nietering | B32B 17/10174 219/203 |

(Continued)

FOREIGN PATENT DOCUMENTS

| | | |
|---|---|---|
| DE | 102004029164 A1 | 12/2005 |
| EP | 2772117 A1 | 9/2014 |
| WO | 2016000927 A1 | 1/2016 |

*Primary Examiner* — Umashankar Venkatesan
(74) *Attorney, Agent, or Firm* — Young Basile Hanlon & MacFarlane, P.C.

(57) ABSTRACT

A heating system includes a conductive layer disposed on a pane surface of a glass pane, a first busbar extending along a first pane edge portion of the glass plane in electrical contact with the conductive layer, and a second busbar extending along a second pane edge portion of the glass plane in electrical contact with the conductive layer. Applying power to the first busbar causes current to travel from the first busbar along the conductive layer to the second busbar, heating the pane surface.

20 Claims, 7 Drawing Sheets

(56) References Cited

U.S. PATENT DOCUMENTS

| | | | |
|---|---|---|---|
| 6,185,812 B1* | 2/2001 | Castle | B32B 17/10036 |
| | | | 29/611 |
| 6,670,581 B1 | 12/2003 | Degand et al. | |
| 8,471,177 B2* | 6/2013 | Chaussade | B32B 17/10045 |
| | | | 219/203 |
| 8,664,570 B2 | 3/2014 | Odeh | |
| 2002/0005398 A1* | 1/2002 | Gillner | B32B 17/10036 |
| | | | 219/203 |
| 2005/0178756 A1* | 8/2005 | Degand | H05B 3/84 |
| | | | 219/203 |
| 2006/0174476 A1* | 8/2006 | Loibl | B32B 17/10036 |
| | | | 29/611 |
| 2006/0201932 A1* | 9/2006 | Degand | H05B 3/84 |
| | | | 219/543 |
| 2018/0267296 A1* | 9/2018 | Richmond | G02B 27/0006 |

\* cited by examiner

GLAZED PANEL HEATING SYSTEMS

CROSS-REFERENCE TO RELATED APPLICATION(S)

This application claims priority to U.S. Provisional Application Ser. No. 62/342,342, filed May 27, 2016, and entitled "Glazed Panel Heating Systems," the contents of which are incorporated herein by reference.

FIELD

This disclosure relates generally to glazed panel heating systems. More particularly, the disclosure relates to heating systems for glass panes that leverage low-profile busbars.

BACKGROUND

Laminated glass, or safety glass, is traditionally formed by bonding either a polyvinyl butyral (PVB) or ethylene-vinyl acetate (EVA) interlayer between two glass panes using a vacuum to remove air from between the glass panes and heat and/or pressure to bond the glass panes together, for example, using an autoclave. Laminated glass can be treated to reduce solar heating or a greenhouse effect by including a coating or glazing, for example, of a silver infrared reflecting (IRR) material along with or as part of the interlayer between the two glass panes.

SUMMARY

The disclosure relates to a glazed panel heating system. In one aspect of the disclosure, a heating system includes a conductive layer disposed on a pane surface of a glass pane, a first busbar extending along a first pane edge portion of the glass plane in electrical contact with the conductive layer, and a second busbar extending along a second pane edge portion of the glass plane in electrical contact with the conductive layer. Applying power to the first busbar causes current to travel from the first busbar along the conductive layer to the second busbar, heating the pane surface.

In another aspect of the disclosure, a heating system includes a first glass pane, a second glass pane, and an interlayer extending between pane surfaces of the first glass pane and the second glass pane. The heating system also includes a first conductive layer extending between the pane surface of the first glass pane and the interlayer and a second conductive layer extending between the pane surface of the second glass pane and the interlayer. The heating system also includes a first busbar extending along an edge portion of the first glass pane and in electrical contact with the first conductive layer, a second busbar extending along an edge portion of the second glass pane and in electrical contact with second conductive layer, and a trace extending along an edge portion of the interlayer and in electrical contact with the first conductive layer and the second conductive layer. Applying power to the first busbar causes current to travel from the first busbar along the first conductive layer to the trace and along the second conductive layer to the second busbar, heating the pane surfaces of the first glass pane and the second glass pane.

In another aspect of the disclosure, a heating system includes a glass pane comprising a trace extending along a first pane edge portion, a first busbar extending along a second pane edge portion, and a conductive layer extending along a pane surface and in electrical contact with the trace and the first busbar. The heating system also includes a seal comprising a sealing surface. The glass pane has a contact position where the first pane edge portion contacts the sealing surface. The seal further includes a second busbar extending along the sealing surface. The second busbar contacts the trace with the glass pane in the contact position. Applying power to the trace causes current to travel from the trace to the second busbar across the conductive layer to the first busbar with the glass pane in the contact position, heating the pane surface.

BRIEF DESCRIPTION OF THE DRAWINGS

The disclosure is best understood using the following detailed description in conjunction with the accompanying drawings. Similar reference numerals in the drawings designate similar elements. Note that the dimensions of the various features can be expanded or reduced for clarity.

DETAILED DESCRIPTION

Glazed panel heating systems are described that leverage low-profile or hidden busbars that increase the transparent area of a glazed panel, reduce the need for frits applied to a surface of the glazed panel or frames enclosing edge portions of the glazed panel, and provide heating of the glazed panel, for example, in defrost or defog conditions. Several low-profile approaches include applying busbars to edge treatments of glazed panels, locating busbars and traces along edge portions of conductive interlayers disposed between glass panes, and locating busbars or traces on surfaces that contact glazed panels, such as seals or fixed structures.

Figure 1A:
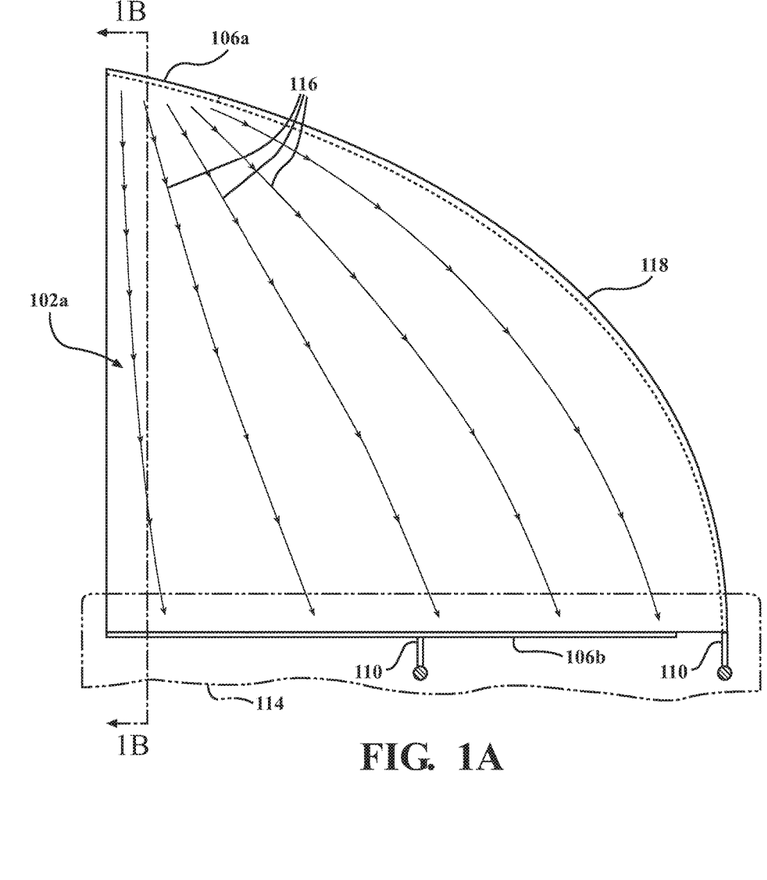
FIG. 1A shows a frameless laminated glass panel front view.
Figure 1B:
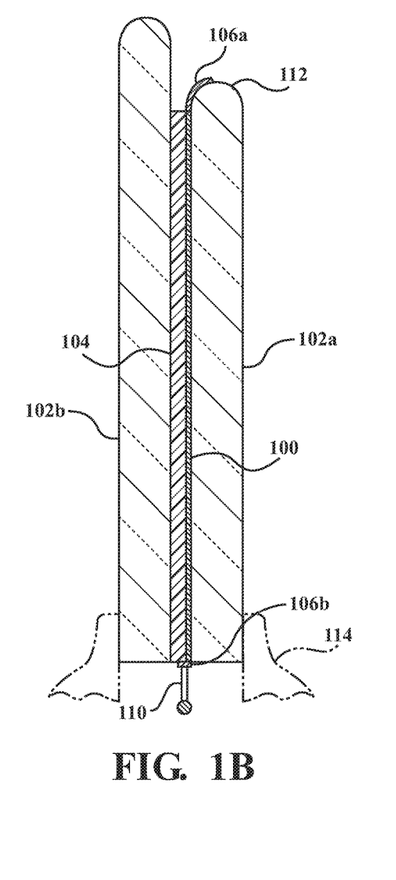
FIG. 1B shows a frameless laminated glass panel sectional view of FIG. 1A with a busbar applied to an edge treatment of a glass pane.

FIG. 1A shows a frameless laminated glass panel front view. FIG. 1B shows a frameless laminated glass panel sectional view as indicated in FIG. 1A. The frameless laminated glass panel includes a glass heating system with a conductive layer 100, glass panes 102a,b, interlayer 104, busbars 106a,b, and power connections 110.

The conductive layer 100 can be formed using, for example, metallic or metal-oxide coatings or dielectric thin films, such as a silver infrared-reflective (IRR) coating or an indium tin oxide (no) film. The coatings or films that form the conductive layer 100 provide solar energy reflection while selectively transmitting visible light and allowing electrical conductivity between the busbars 106a,b. The conductive metal or metal-oxide used to form the conductive layer 100 can be sprayed or deposited in one or more layers on one of the glass panes 102a,b, for example, to form a coating, or can be applied using a PET film adhered to the interlayer 104 laminated between the glass panes 102a,b.

The glass panes 102a,b can be formed using, for example, standard transparent glass materials. Alternatively, the glass panes 102a,b can be formed using tempered glass, optical cast plastics, or any other material that is both generally transparent and suitable for coating or glazing in a manner required for use of the glazed panel heating systems described here.

The interlayer 104 used for adhesion during lamination can be formed of PVB or EVA as described above. Other materials suitable for the interlayer 104 include thermoset EVA, thermoplastic polyurethane (TPU), and polyester (PE). The type and thickness of the material chosen for the interlayer 104 can be based on the type and thickness of the glass panes 102a,b used for a given glazed panel application.

The busbars 106a,b can be formed using, for example, conductive metals such as copper, silver, gold, or aluminum. The busbars 106a,b can be disposed along pane edge portions in the form of a strip or deposited using processes such as screen printing or thin-film deposition. In the example of FIGS. 1A and 1B, the busbars 106a,b extend along opposing pane edge portions of the glass pane 102a with the upper busbar 106a extending along a top edge portion of the glass pane 102a and the lower busbar 106b extending along a bottom edge portion of the glass pane 102a. Other configurations for the busbars 106a,b are also possible. The conductive layer 100 extends along a pane surface of the glass pane 102a and is in electrical contact with the busbars 106a,b.

The power connections 110 in the examples of FIGS. 1A and 1B and in various embodiments of the disclosure described below can be designed to supply power to or carry power from the busbars 106a,b. In other words, one of the power connections 110 supplies power to one of the busbars 106b, causing current to travel along the conductive layer 100, heating the glass panes 102a,b. The other of the power connections 110 carries power away from the conductive layer 100, for example, to a ground (not shown).

The glass heating system of FIGS. 1A and 1B can be used, for example, with a side window in a vehicle where both movement and increased transparency of the laminated glass panel are desired. The upper busbar 106a can be located along an edge treatment 112 of the glass pane 102a as further described below. The lower busbar 106b can be located along a lower edge portion of the glass pane 102a and can be hidden from view, for example, by a fixed structure 114.

If the laminated glass panel serves as a side window of a vehicle door, the fixed structure 114 can be a belt line of the vehicle door. The position of the glass pane 102a in respect to the belt line of the vehicle door is such that the lower edge portion of the glass pane 102a is blocked from view by the belt line. Even when the frameless laminated glass panel is designed to move up and down, that is, into and out of, the vehicle door, the lower edge portion of the frameless laminated glass panel will remain covered by the fixed structure 114, that is, the belt line. Designing mechanisms to control this movement, such as rails, guides, and seals, is simplified by the absence of a frame around the laminated glass panel.

FIG. 1A shows one power connection 110 coupled to a central portion of the lower busbar 106b and another power connection 110 coupled to the upper busbar 106a through a trace 118. The trace 118 can extend along the edge treatment 112 of the edge portion of the glass pane 102a to reach the upper busbar 106a. FIG. 1A also shows a current path 116 in lines with arrows as extending from the upper busbar 106a to the lower busbar 106b. The upper busbar 106a extends along only an upper corner of the curved upper edge portion of the glass pane 102a such that the trace 118 is required to electrically couple the upper busbar 106a and the power connection 110.

The trace 118 can include, for example, a conductive wire or foil sufficient to carry current between the power connection 110 and the upper busbar 106a. The lengths of the upper busbar 106a and the trace 118 can vary depending on the desired shape and distribution of the current path 116. As the lower busbar 106b extends for most of the lower edge portion of the glass pane 102a, the current path 116 fans out as it travels from the upper busbar 106a to the lower busbar 106b. The current path 116 is not visible. Instead, the dotted lines and arrows of the current path 116 show the progression of heating across the glass pane 102a when power is applied to the upper busbar 106a using the power connection 110. Various current paths are possible, for example, depending on the placement and size of the busbars 106a,b and the trace 118.

As best shown in the sectional view of FIG. 1B, the laminated glass panel includes the glass panes 102a,b, the conductive layer 100, and the interlayer 104, with the conductive layer 100 and the interlayer 104 disposed between the glass panes 102a,b. The upper busbar 106a can be applied to the edge treatment 112 of an upper edge portion of the glass pane 102a. Various edge treatments 112 for the edge portion of the glass pane 102a are possible. The edge treatment 112 can be a machine-ground edge, for example, where a grinding wheel is used to generate a smooth finish on the edge of the glass. Machine-ground edge treatments include shaping the edge portion of the glass pane 102a with a round or pencil-edge shape having a "C"-shaped radius or shaping the edge portion of the glass pane 102a with a flat-edge shape where a 45-degree chamfer is applied to top and bottom corners of the edge portion of the glass pane 102a, though other shapes are also possible. The edge treatment 112 can also be a machine-polished edge, for example, where a machine-ground edge portion of the glass pane 102a is polished to a sheen finish. The edge treatment 112 can also be a cut edge or a seamed edge, i.e. a safety seam edge or swiped edge, where sanding is used to lightly chamfer the edge portion of the glass pane 102a.

As shown in FIG. 1B, the upper busbar 106a is located along the edge treatment 112 of the upper edge portion of the glass pane 102a, and the lower busbar 106b extends along a lower edge portion of the glass pane 102a. The conductive layer 100 is in contact with the busbars 106a,b. The upper busbar 106a is located in such a manner as to limit visibility of the upper busbar 106a while retaining transparency through most of the glass pane 102a. For example, the upper busbar 106a is shown as having a curved shape pressed against the curved edge treatment 112.

As the presence of the edge treatment 112 can limit transparency of the glass pane 102a at the location of the edge treatment 112, locating the upper busbar 106a along the edge treatment 112 can block visibility of the upper busbar 106a based on the limited transparency of the edge treatment 112. This relationship holds whether the edge treatment 112 is rounded, slanted, ground, polished, or otherwise shaped or applied to the upper edge portion of the glass pane 102a. Locating the upper busbar 106a along the edge treatment 112 also allows for increased transparency of the frameless laminated glass panel as compared, for example, to solutions where the upper busbar 106a would be located between the glass panes 102a,b.

Figure 2A:
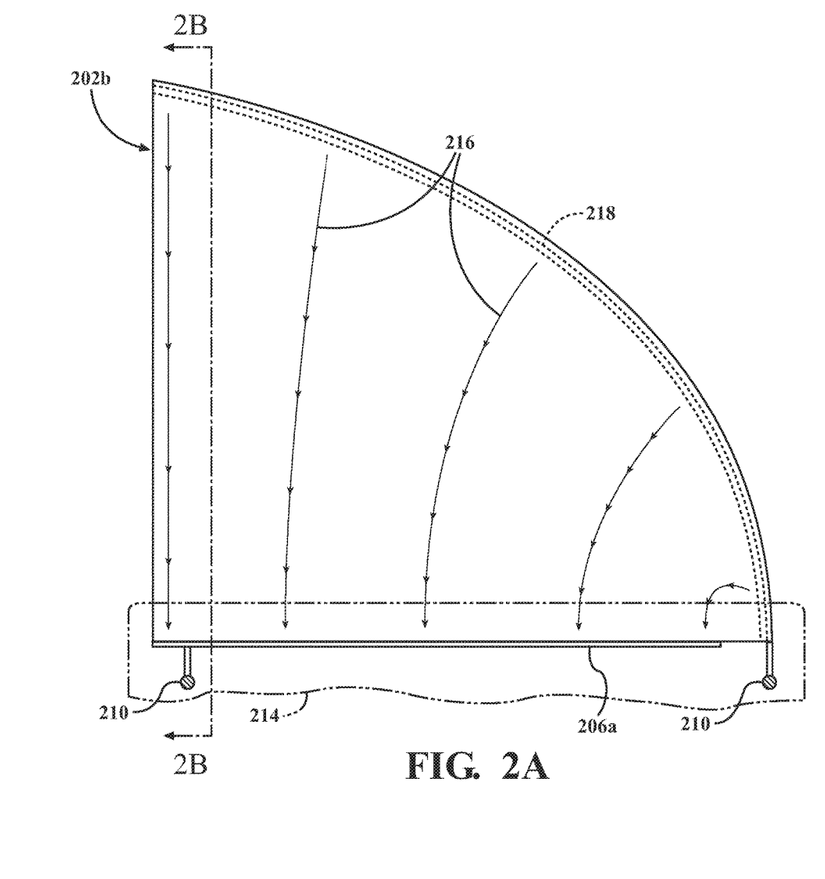
FIG. 2A shows another frameless laminated glass panel front view.
Figure 2B:
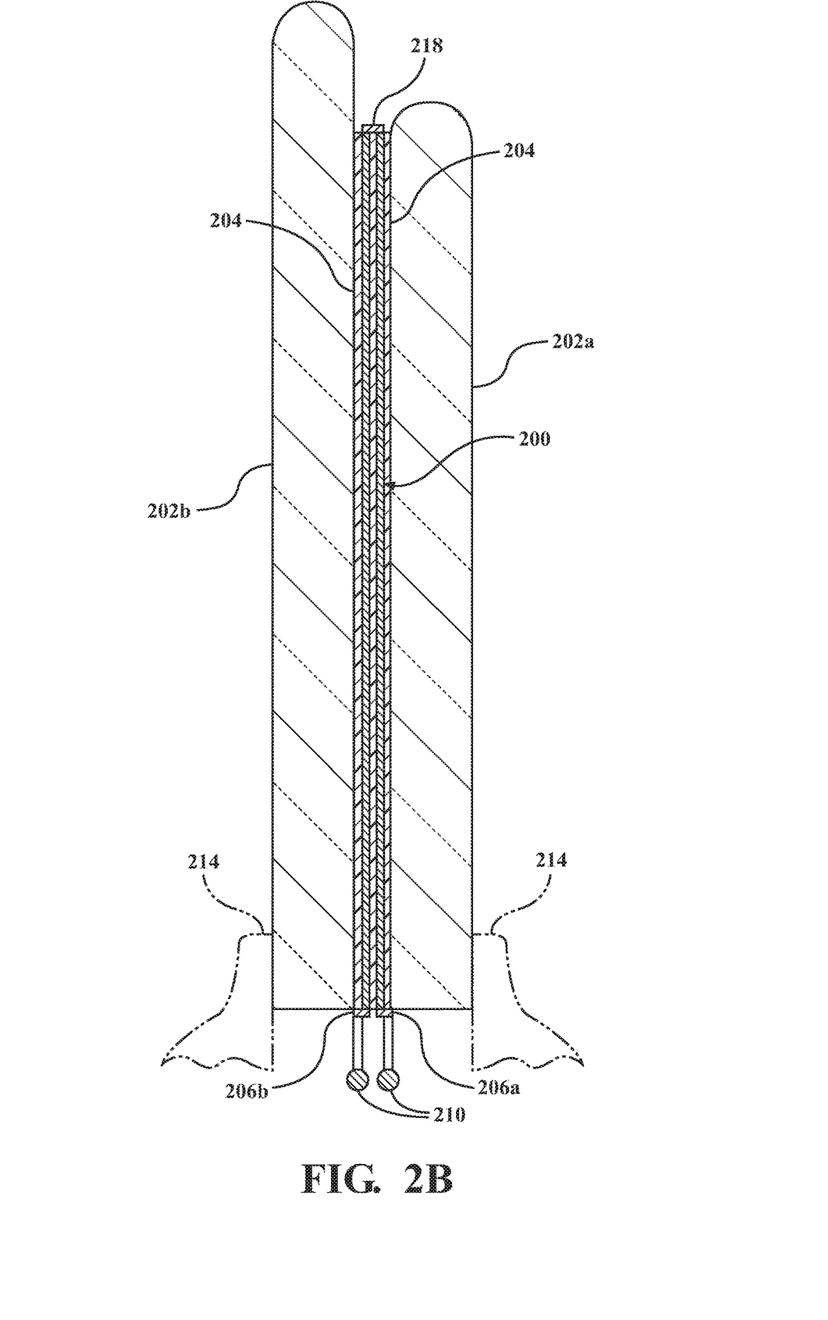
FIG. 2B shows a frameless laminated glass panel sectional view of FIG. 2A with a trace extending along an edge of a conductive layer.

FIG. 2A shows a frameless laminated glass panel front view. FIG. 2B shows a frameless laminated glass panel sectional view as indicated in FIG. 2A. The frameless laminated glass panel includes a glass heating system with conductive layers 200, glass panes 202a,b, interlayers 204, busbars 206a,b, power connections 210, and a trace 218 extending along an edge of the conductive layers 200.

FIG. 2A shows a front view of the glass pane 202B and shows, in hidden view, that the trace 218 extends for the entire upper edge portion of the laminated glass panel. FIG. 2A also shows that a current path 216, represented in lines with arrows, is generated by applying power to one of the power connections 210 is such that current travels along a surface of the glass pane 202b from the trace 218 to the busbar 206b. If the other of the glass panes 202a were shown, current would travel from the busbar 206a to the trace 218 in an upward direction. Varied lengths and positions for the busbars 206a,b and the trace 218 can be used to form a variety of current paths 216 across the glass panes 202a,b in order to heat the surfaces of the glass panes 202a,b in a manner desired for the application. Each of the busbars 206a,b can be in electrical contact with one of the power connections 210, with the pair of power connections 210 being located on lower edge portions but on opposite corners and on opposing glass panes 202a,b of the laminated glass panel.

As best shown in FIG. 2B, the laminated glass panel includes a first glass pane 202a, a second glass pane 202b, an interlayer 204, and a pair of conductive layers 200. The interlayer 204 in the example of FIG. 2B differs from that of prior examples in that it is bisected by a pair of conductive layers 200. The conductive layers 200 can be formed, for example, of IRR layers deposited on opposing sides of a PET film. The first busbar 206a extends along a lower edge portion of the first glass pane 202a and is in electrical contact with one of the conductive layers 200. The second busbar 206b extends along a lower edge portion of the second glass pane 202b and is in electrical contact with the other of the conductive layers 200. The trace 218 extends along an upper edge portion of the interlayer 204 and is in electrical contact with both of the conductive layers 200.

In one alternative of the FIG. 2B embodiment, each of the glass panes 202a, 202b can be coated with a conductive layer 200, and the interlayer 204 can be disposed between the two conductive layers 200 instead of being bisected by a PET film coated on both sides with conductive layers 200. Applying power to the first busbar 206a using a power connection 210 causes current to travel from the first busbar 206a along either the the first conductive layer 200 to the trace 218 and along the second conductive layer 200 to the second busbar 206b, heating pane surfaces of the first glass pane 202a and the second glass pane 202b.

By locating the trace 218 along an edge portion of the interlayer 204, the busbars 206a,b can be located in a manner that is easily blocked from visibility by a fixed structure 214, such as a belt line of a vehicle door. Further, the trace 218 can be blocked from visibility or nearly blocked from visibility through the glass panes 202a,b based on its position as extending along an upper edge portion of the interlayer 204. Though the trace 218 could be visible from a position above the laminated glass panel, it would barely be visible through the glass panes 202a,b of the laminated glass panel based on the orientation at which the trace 218 extends in respect to the viewing direction through the glass panes 202a,b. This position for the trace 218 is desirable in frameless applications for the glass panes 202a, b.

Figure 3A:
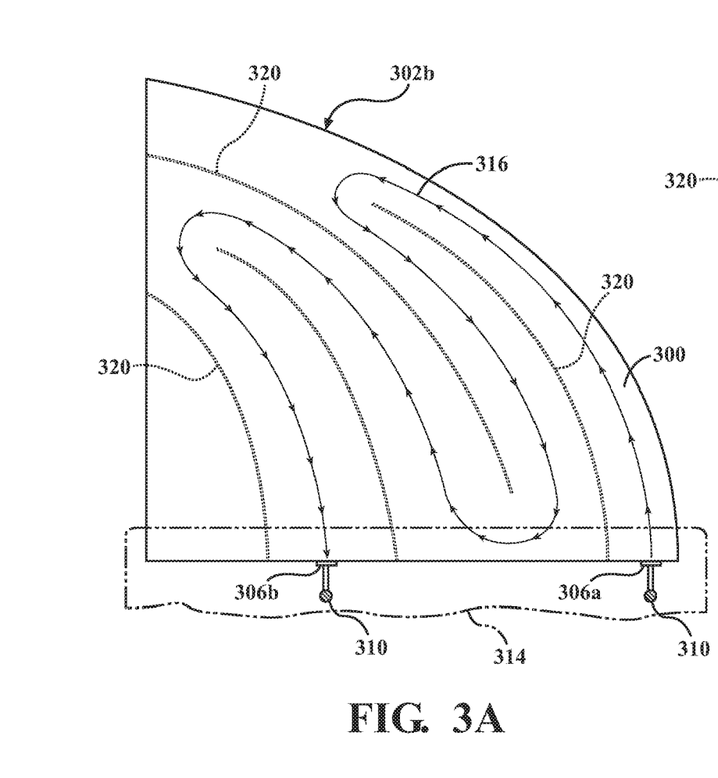
FIG. 3A shows another frameless laminated glass panel front view with etchings in the coating, glazing, or film deposited on a glass pane.
Figure 3B:
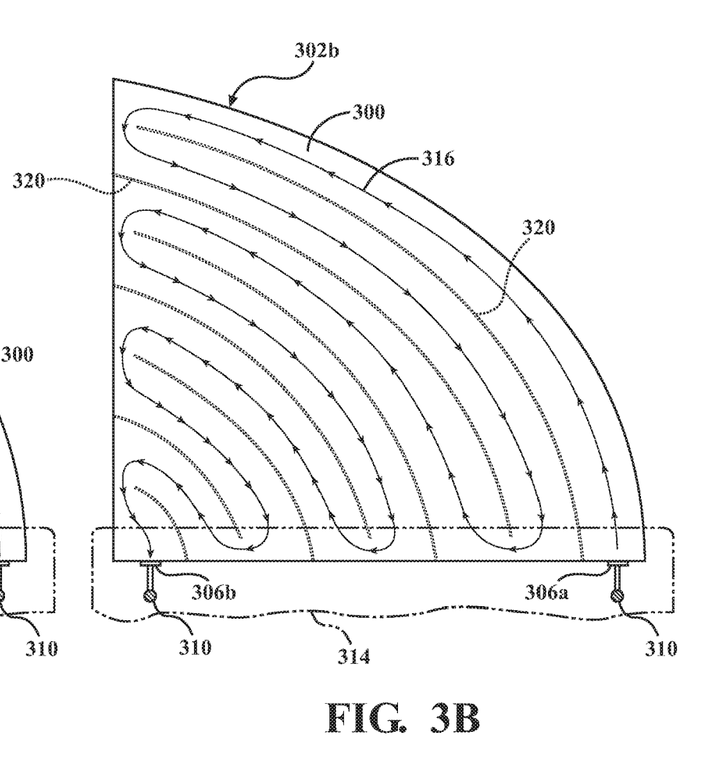
FIG. 3B shows another frameless laminated glass panel front view with etchings in the coating, glazing, or film deposited on a glass pane.

FIG. 3A shows a frameless laminated glass front view with a non-conductive pattern 320 formed in the coating, glazing, or film forming a conductive layer 300 on the glass pane 302b. FIG. 3B shows another frameless laminated glass panel front view with another non-conductive pattern 320 formed in the coating, glazing, or film forming the conductive layer 300 on the glass pane 302b. The pattern 320 can be etched into the conductive layer 300, reserved as a void surrounded by the conductive material of the conductive layer 300, or otherwise formed as a non-conductive portion of the conductive layer 300. The pattern 320 serves to direct a current path 316 shown in lines with arrows along the glass pane 302b between a first busbar 306a in electrical contact with the conductive layer 300 and a second busbar 306b in electrical contact with the conductive layer 300. Applying power, using, for example, a power connection 310, to the first busbar 306a causes current to travel from the first busbar 306a along the current path 316 between the various portions of the pattern 320 to the second busbar 306b, heating a surface of the glass pane 302b.

As shown in FIG. 3A, the pattern 320 can include lines spaced and staggered in a manner that focuses heating in specific areas of the glass pane 302b and avoids heating other areas of the glass pane 302b. Alternatively, and as shown in FIG. 3B, the pattern 320 can include equidistantly spaced lines alternatingly extending from perpendicular edge portions of the glass pane 302b to evenly distribute heating across the glass pane 302b when power is applied. If the lines of the pattern 320 are etched or voided, the etching or voids can be filled with an index-matched, non-conductive material to mask the etching and avoid refraction, masking the pattern 320 from visibility through the laminated glass panel. Though two example patterns 320s are shown in FIGS. 3A and 3B, a variety of patterns are possible.

The use of patterns 320 etched, carved, or otherwise differentiated from the conductive layer 300 on the glass pane 302b to direct the current path 316 allows specific areas of the glass pane 302b to be targeted for heating while at the same time co-locating the busbars 306a,b along the same edge portion of the laminated glass panel to hide the busbars 306a,b from view behind, for example, structure 314 such as a belt line of a vehicle door when the remainder of the glass pane 302b is frameless. The pattern 320 can also be formed using various styles and shapes of etchings or carvings (not shown) for decorative purposes. That is, decorations can be made visible on the glass pane 302b during the heating process if desired.

Figure 4A:
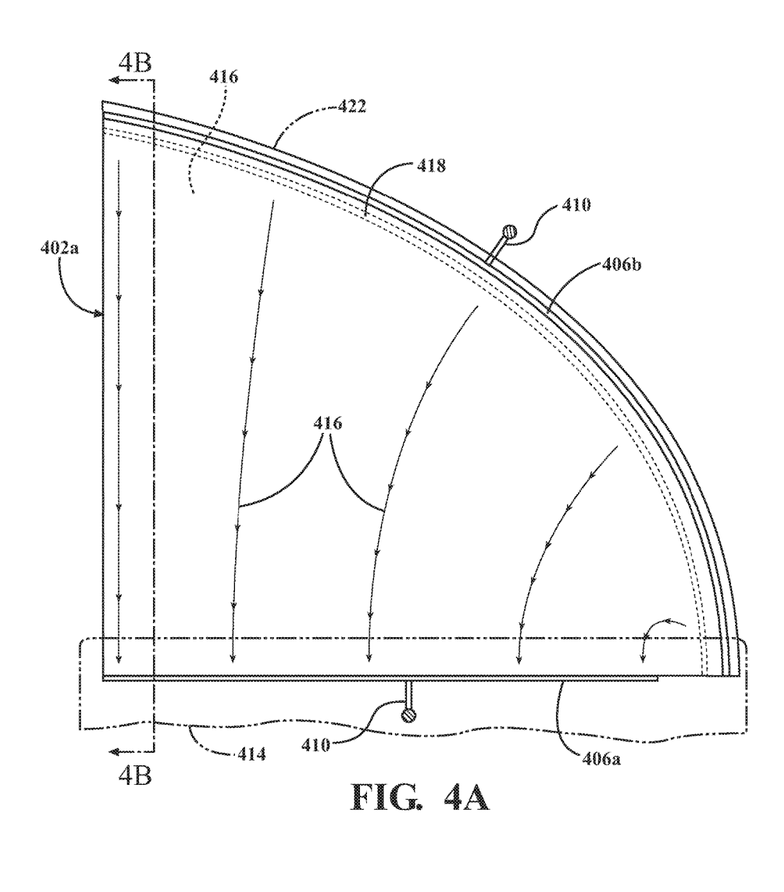
FIG. 4A shows another frameless laminated glass panel front view.
Figure 4B:
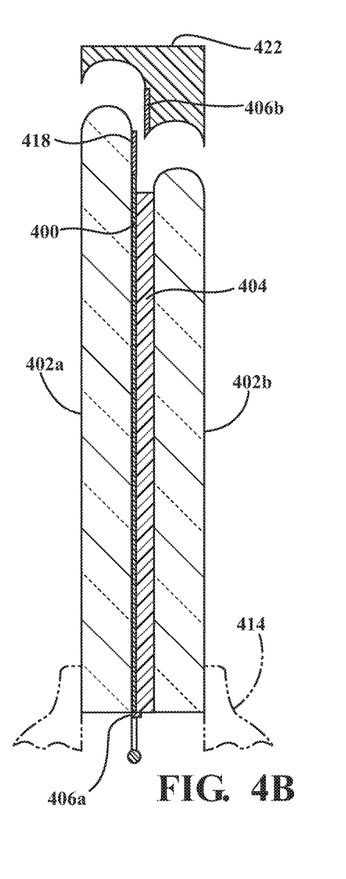
FIG. 4B shows a frameless laminated glass panel sectional view of FIG. 4A with a busbar coupled to a seal or structure abutting a glass pane.

FIG. 4A shows a frameless laminated glass panel front view. FIG. 4B shows a frameless laminated glass sectional view as indicated in FIG. 4A. The frameless laminated glass panel includes a glass heating system with a conductive layer 400, glass panes 402a,b, an interlayer 404, busbars 406a,b, power connections 410, a trace 418, and a seal 422. The seal 422 is configured to contact upper edge portions of one or both of the glass panes 402a,b when the laminated glass panel is moved into a contact position with the seal 422. The seal 422 can be, for example, located along a door frame or a door header when the laminated glass panel is used as a vehicle side window.

FIG. 4A shows a front view of the glass pane 402a and shows that each of the busbars 406a,b can be in electrical contact with a power connection 410. The lower, first busbar 406a can be located adjacent a lower edge portion of the glass pane 402a. The upper, second busbar 406b can be located along a sealing surface of the seal 422. FIG. 4A also shows, in hidden view, that the trace 418 can extend for the entire upper edge portion of the glass pane 402a such that contact between the trace 418 and the upper busbar 406b is possible when the glass pane 402a is in the contact position.

FIG. 4A also shows a current path 416 in lines with arrows. The current path 416 is generated by applying power to the upper power connection 410 when the laminated glass panel is in the contact position such that current travels from the upper busbar 406b on the seal 422, to the trace 418 on the glass pane 402a, along a surface of the glass pane 402a, and to the lower busbar 406a. The lower busbar 406a can be located in a manner that is easily blocked from visibility by a structure 414, such as a belt line of a vehicle door. The upper busbar 406b is also located in a manner that is easily blocked from visibility based on its placement along the sealing surface of the seal 422.

As best shown in FIG. 4B, the laminated glass panel includes the glass panes 402a,b sandwiching the conductive layer 400 and the interlayer 404. The glass pane 402a includes the trace 418 extending along a first, upper pane edge portion, the first busbar 406a extending along a second, lower pane edge portion, and the conductive layer 400 extending along a pane surface of the glass pane 402a. The conductive layer 400 is in electrical contact with the trace 418 and the first busbar 406a. The first pane edge portion of the glass pane 402a can be designed for contact with the seal 422 when the laminated glass panel is moved to the contact position. FIGS. 4A and 4B show the laminated glass panel in a non-contact position for clarity.

The seal 422 can include a sealing surface, and the contact position of the laminated glass panel can put the upper pane edge portion of the glass pane 402a in contact with the sealing surface of the seal 422. The seal 422 can also include a second busbar 406b extending along the sealing surface. The second busbar 406b can contact the trace 418 when the laminated glass panel is in the contact position with the upper pane edge portion of the glass pane 402a being pressed against the sealing surface of the seal 422. Applying power to the trace 418 causes current to travel from the trace 418 to the second busbar 406b, across the conductive layer 400, to the first busbar 406a when the laminated glass panel is in the contact position, heating the pane surface.

The positions of the second busbar 406b and the trace 418 can also be reversed, that is, the second busbar 406b can extend along the upper pane edge portion of the glass pane 402a and the trace 418 can extend along the sealing surface of the seal 422. In this example, applying power to the trace 418 would similarly cause current to travel from the trace 418 to the second busbar 406b across the conductive layer 400 to the first busbar 406a when the laminated glass panel is in the contact position, heating the pane surface. The ability to couple the second busbar 406b to the sealing surface is beneficial, for example, when the glass pane 402a is part of a frameless vehicle side window, as the second busbar 406b will not obstruct visibility through the laminated glass panel.

Figure 5A:
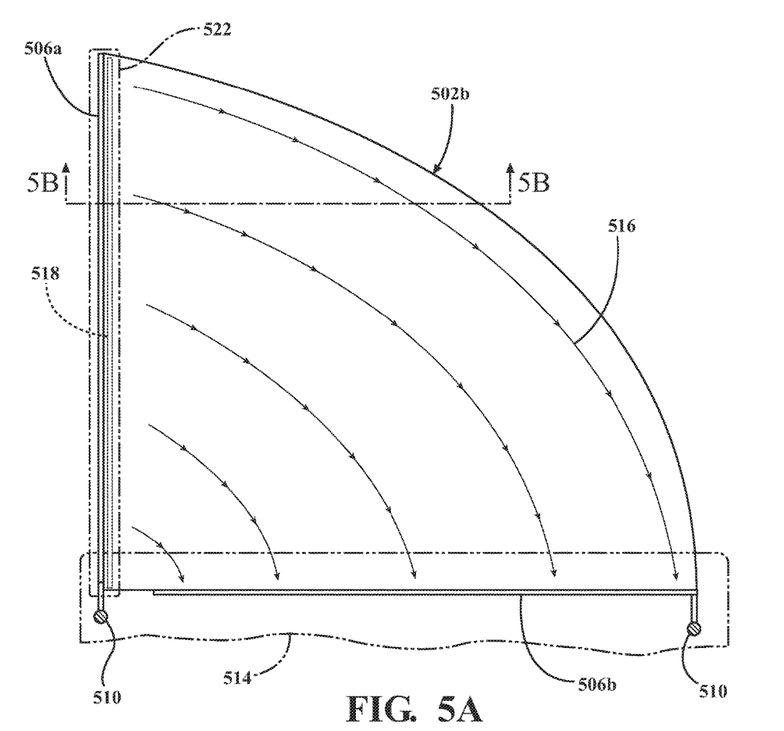
FIG. 5A shows another frameless laminated glass panel front view.
Figure 5B:
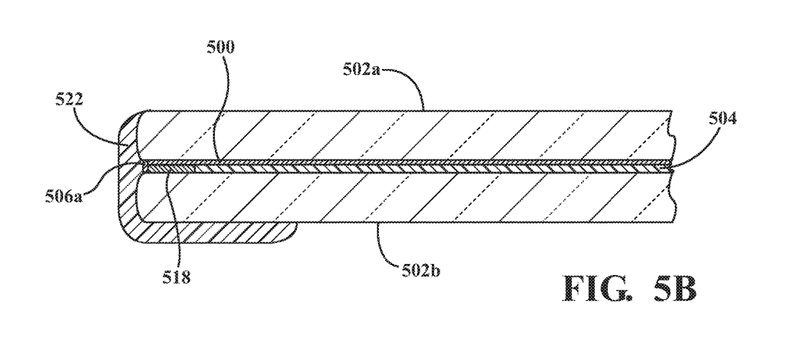
FIG. 5B shows a frameless laminated glass panel sectional view of FIG. 5A with a busbar covered by an overmold.

FIG. 5A shows a frameless laminated glass panel front view. FIG. 5B shows a frameless laminated glass sectional view as indicated in FIG. 5A. The laminated glass panel includes a glass heating system with a conductive layer 500, glass panes 502a,b, an interlayer 504, busbars 506a,b, power connections 510, a trace 518, and a seal 522. The seal 522 is shown in dotted-line view in FIG. 5A as obstructing both the busbar 506a and the trace 518 from view. The seal 522 can be used, for example, when the laminated glass panel is a side window in a convertible vehicle or when the laminated glass panel abuts a second laminated glass panel.

As shown in FIG. 5A, the seal 522 can be attached to a side edge portion of the laminated glass panel. The busbar 506b can extend along a lower edge portion of the laminated glass panel that remains hidden behind a structure 514, such as a belt line of a vehicle door, regardless of the position of the laminated glass panel. Applying power to the trace 518, using, for example, the left-side power connection 510, causes current to travel in a current path 516 represented in lines and arrows from the trace 518 to the busbar 506a, across the conductive layer 500, to the busbar 506b, heating a pane surface of the glass pane 502b.

As shown in FIG. 5B, the two glass panes 502a,b sandwich the interlayer 504. The conductive layer 500 extends along a pane surface of the glass pane 502a. The trace 518 extends along a pane edge portion of the glass pane 502b, with the trace 518 in contact with the conductive layer 500. The positions of the trace 518 and the conductive layer 500 in respect to the glass panes 502a,b can also be reversed without impacting the function of the glass heating system.

The seal 522 can encapsulate, be adhered to, or be otherwise designed to surround or cover edge portions of both of the glass panes 502a,b, that is, to cover an edge portion of the laminated glass panel in a fixed manner or in a manner that allows the laminated glass panel to slide along the seal 522. The busbar 506a can extend along a sealing surface of the seal 522 in a manner such that the busbar 506a contacts one or both of the trace 518 and the conductive layer 500 when the seal 522 is in a contact position with the glass panes 502a,b. For example, when the seal 522 is coupled to the laminated glass panel, the busbar 506a can extend along an exterior edge of the trace 518 and the conductive layer 500 as shown with the seal 522 surrounding edge portions of the glass panes 502a,b. Including the busbar 506a as part of the seal 522 increases the transparent surface area of the glass panes 502a,b since the busbar 506a does not need to be packaged between the glass panes 502a,b.

The various embodiments of the glass heating system described above provide a faster defrosting solution for vehicle glass than is possible using HVAC-based defrost systems. The resulting defrost pattern can be better controlled in terms of uniformity, and the use of a glazed panel heating system does not negatively impact passenger comfort by diverting climate control resources. Though the examples are described above in respect to frameless glass, the low-profile options would also be suitable in a more traditional framed-glass or framed-panel system, for example, for architectural purposes. Further, though laminated glass is used in the examples, many of the glazed panel heating systems described above can be executed using a single pane of glass or other transparent, heatable material.

Figure 6:
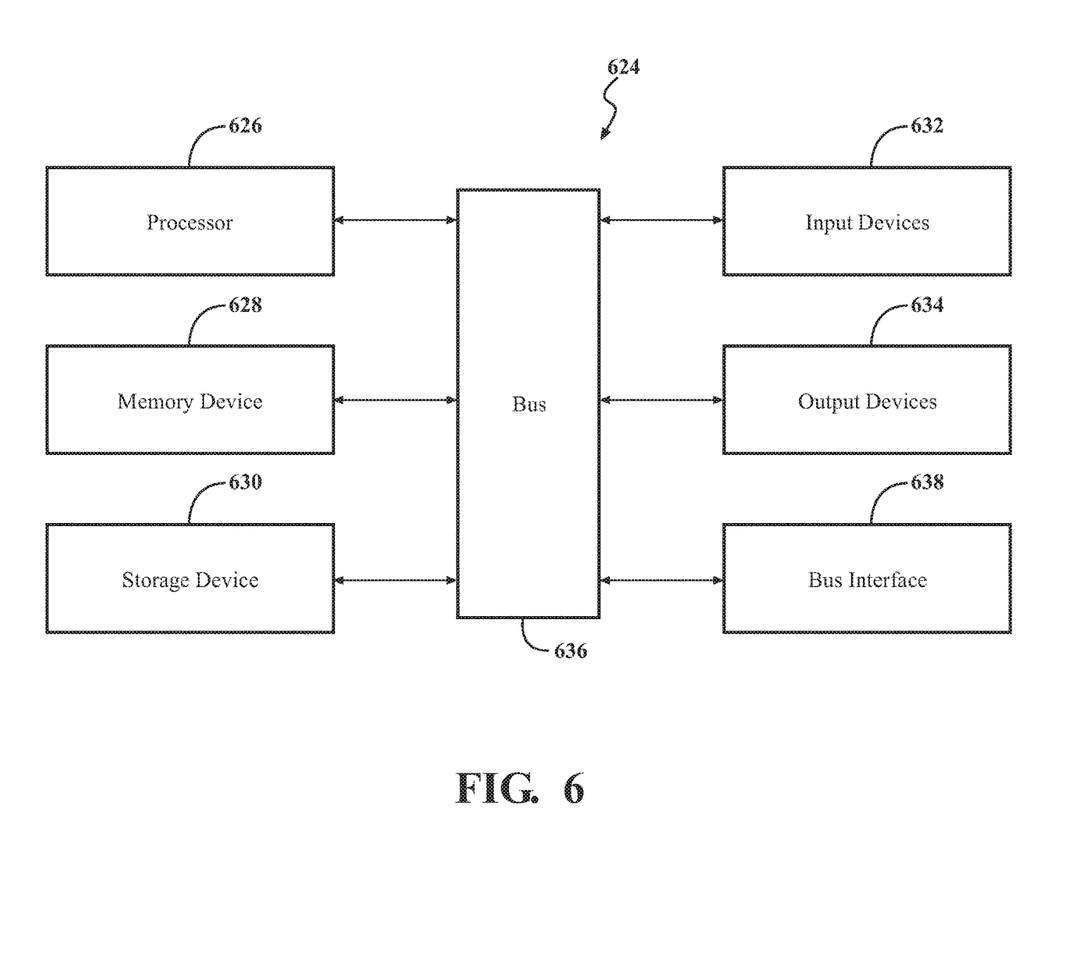
FIG. 6 is a block diagram of an example of a computing device.

FIG. 6 is a block diagram of an example of a computing device 624. The computing device 624 can be a single computing device or a system that includes multiple computing devices working cooperatively. As an example, the computing device 624 could be a vehicle-based computing device such as a vehicle ECU that sends commands to the glazed panel heating systems in the above-described embodiments. Alternatively, the computing device 624 could be a desktop computer, a laptop computer, a tablet, or a mobile device such as a smart phone.

In the illustrated example, the computing device 624 includes a processor 626, a memory device 628, a storage device 630, one or more input devices 632, and one or more output devices 634 which are interconnected by a bus 636. The computing device 624 can also include a bus interface 638 for connecting peripheral devices to the bus 636.

The processor 626 can be any type of device that is able to process or manipulate information, including devices that are currently known and devices that may be developed in the future. As an example, the processor 626 can be a conventional central processing unit (CPU). Although the illustrated example shows a single processor, multiple processors can be used instead of a single processor.

The memory device 628 can be used to store information for immediate use by the processor 626. The memory device 628 includes either or both of a random access memory (RAM) device and a read only memory (ROM) device. The memory device 628 can be used to store information, such as program instructions that can be executed by the processor 626, and data that is stored by and retrieved by the processor 626. In addition, portions of the operating system of the computing device 624 and other applications that are being executed by the computing device 624 can be stored by the memory device during operation of the computing device 624.

The storage device 630 can be used to store large amounts of data persistently. As examples, the storage device 630 can be a hard disk drive or a solid state drive.

The input devices 632 can include any type of device that is operable to generate computer interpretable signals or data in response to user interaction with the computing device 624, such as physical interaction, verbal interaction, or non-contacting gestural interaction. As examples, the input devices 632 can include one or more of a keyboard, a mouse, a touch-sensitive panel with or without an associated display, a trackball, a stylus, a microphone, a camera, or a three-dimensional motion capture device.

The output devices 634 can include any type of device that is able to relay information in a manner that can be perceived by a user. As examples, the output devices 634 can include one or more of an LCD display screen, an LED display screen, a CRT display screen, a printer, an audio output device such as a speaker, or a haptic output device. In some implementations, the output devices 634 include a display screen and the input devices 632 include a touch sensitive panel that is integrated into the display screen to define a touch-sensitive display screen.

The bus 636 transfers signals and/or data between the components of the computing device 624. Although depicted as a single bus, it should be understood that multiple or varying types of buses can be used to interconnect the components of the computing device 624. The bus interface 638 can be any type of device that allows other devices, whether internal or external, to connect to the bus 636. In one implementation, the bus interface 638 allows connection to a controller area network (CAN) bus of a vehicle.

What is claimed is:

1. A heating system, comprising:
   a conductive layer disposed on a pane surface of a glass pane;
   a first busbar extending along a first pane edge portion of the glass plane in electrical contact with the conductive layer; and
   a second busbar extending along a second pane edge portion of the glass plane in electrical contact with the conductive layer;
   wherein applying power to the first busbar causes current to travel from the first busbar along the conductive layer to the second busbar, heating the pane surface,
   wherein the first pane edge portion includes an edge treatment comprising at least one of a cut edge, a seamed edge, a swiped edge, a machine-ground edge, or a machine-polished edge, and
   wherein the first busbar extends along the edge treatment of the first pane edge portion.

2. The heating system of claim 1, further comprising:
   a trace extending along the edge treatment of the first pane edge portion between a power connection and the first busbar.

3. The heating system of claim 1, further comprising:
   a pattern in the conductive layer, the pattern forming a current path between the first busbar and the second busbar.

4. The heating system of claim 3, wherein the pattern includes lines or voids etched or carved into the conductive layer.

5. The heating system of claim 4, wherein the lines are non-equidistantly spaced to focus heating predetermined portions of the pane surface of the glass pane.

6. The heating system of claim 4, wherein the lines are equidistantly spaced and extend alternatingly from the first pane edge portion Doll and the second pane edge portion of the glass pane to evenly distribute heating across the pane surface of the glass pane.

7. The heating system of claim 4, wherein the lines or voids in the conductive layer are filled with an index-matched, non-conductive material.

8. The heating system of claim 1, wherein the first pane edge portion extends along a top edge of the glass pane and the second pane edge portion extends along a bottom edge of the glass pane.

9. The heating system of claim 1, wherein the first pane edge portion and the second pane edge portion extend along a bottom edge of the glass pane.

10. A heating system, comprising:
    a first glass pane;
    a second glass pane;
    an interlayer extending between a pane surface of the first glass pane and a pane surface of the second glass pane;
    a first conductive layer extending between the pane surface of the first glass pane and the interlayer;
    a second conductive layer extending between the pane surface of the second glass pane and the interlayer;
    a first busbar extending along a first edge portion of the first glass pane and in electrical contact with a first edge portion of the first conductive layer;
    a second busbar extending along a first edge portion of the second glass pane and in electrical contact with a first edge portion of the second conductive layer; and
    a trace extending between a second edge portion of the first glass pane and a second edge portion of the second glass pane along an edge portion of the interlayer and in electrical contact with a second edge portion of the first conductive layer and a second edge portion of the second conductive layer;
    wherein applying power to the first busbar causes current to travel from the first busbar along the first conductive layer to the trace along the edge portion of the interlayer and along the second conductive layer to the second busbar, heating the pane surfaces of the first glass pane and the second glass pane.

11. The heating system of claim 10, wherein the interlayer is a first interlayer, further comprising:
a second interlayer extending between the pane surface of the first glass pane and the first conductive layer.

12. The heating system of claim 10, wherein the interlayer is a first interlayer, further comprising:
a second interlayer extending between the pane surface of the second glass pane and the second conductive layer.

13. The heating system of claim 10, further comprising:
a first power connection located on the first edge portion of the first glass pane in electrical contact with the first busbar; and
a second power connection located on the first edge portion of the second glass pane in electrical contact with the second busbar.

14. The heating system of claim 10, wherein the first edge portion of the first glass pane extends along a bottom edge of the first glass pane, the second edge portion of the first glass pane extends along a top edge of the first glass pane, the first edge portion of the second glass pane extends along a bottom edge of the second glass pane, and the second edge portion of the second glass pane extends along a top edge of the second glass pane.

15. The heating system of claim 10, wherein a pattern of lines or voids etched or carved into the first or second conductive layer and filled with an index-matched, non-conductive material form a current path between the trace and the first or second busbar.

16. A heating system, comprising:
a glass pane, comprising:
a trace extending along a first pane edge portion;
a first busbar extending along a second pane edge portion; and
a conductive layer extending along a pane surface and in electrical contact with the trace and the first busbar; and
a seal, comprising:
a sealing surface, wherein the glass pane has a contact position where the first pane edge portion of the glass pane contacts the sealing surface of the seal and a non-contact position where the glass pane does not contact the seal; and
a second busbar extending along the sealing surface, wherein the second busbar contacts the trace extending along the first pane edge portion of the glass pane with the glass pane in the contact position;
wherein applying power to the trace causes current to travel from the trace to the second busbar to the conductive layer to the first busbar with the glass pane in the contact position, heating the pane surface.

17. The heating system of claim 16, wherein the seal blocks visibility of the trace and the second busbar with the glass pane in the contact position.

18. The heating system of claim 16, wherein the first pane edge portion extends along a top edge of glass pane and the second pane edge portion extends along a bottom edge of the glass pane.

19. The heating system of claim 16, wherein the first pane edge portion extends along a side edge of glass pane and the second pane edge portion extends along a bottom edge of the glass pane.

20. The heating system of claim 16, wherein a pattern of lines or voids etched or carved into the conductive layer and filled with an index-matched, non-conductive material form a current path between the second busbar, the trace, and the first busbar.

* * * * *

UNITED STATES PATENT AND TRADEMARK OFFICE
CERTIFICATE OF CORRECTION

PATENT NO. : 10,314,116 B1
APPLICATION NO. : 15/595158
DATED : June 4, 2019
INVENTOR(S) : David E. Kingman et al.

Page 1 of 1

It is certified that error appears in the above-identified patent and that said Letters Patent is hereby corrected as shown below:

On the Title Page

In the Abstract:
In Line Number 3, "plane" should be --pane--.
In Line Number 6, "plane" should be --pane--.

In the Specification

In Column 1, Line Number 36, "plane" should be --pane--.
In Column 1, Line Number 38, "plane" should be --pane--.

In the Claims

In Column 9, Claim Number 1, Line 66, "plane" should be --pane--.
In Column 10, Claim Number 1, Line 2, "plane" should be --pane--.
In Column 10, Claim Number 6, Line 30, "portion Doll and" should be --portion and--.

Signed and Sealed this
Sixteenth Day of July, 2019

Andrei Iancu
*Director of the United States Patent and Trademark Office*